(12) United States Patent
Cho et al.

(10) Patent No.: US 6,315,816 B1
(45) Date of Patent: Nov. 13, 2001

(54) ADSORBENTS, METHOD FOR THE PREPARATION AND METHOD FOR THE SEPARATION OF UNSATURATED HYDROCARBONS FOR GAS MIXTURES

(75) Inventors: Soon Haeng Cho; Sang Sup Han; Jong Nam Kim, all of Taejon (KR); Nettem Venkateswarlu Choudary, Gujarat (IN); Prakash Kumar, Gujarat (IN); Sodankoor Garadi Thirumaleshwara Bhat, Gujarat (IN)

(73) Assignees: Korea Institute of Energy Research; Indian Petrochemicals Corp. Ltd., Guuarat (IN)

( * ) Notice: Subject to any disclaimer, the term of this patent is extended or adjusted under 35 U.S.C. 154(b) by 0 days.

(21) Appl. No.: 09/411,990

(22) Filed: Oct. 4, 1999

(30) Foreign Application Priority Data

Sep. 23, 1999 (IN) ............................................. 1289/DEL/99

(51) Int. Cl.⁷ ..................................................... B01D 53/04
(52) U.S. Cl. .................................. 95/96; 95/114; 95/144; 95/900; 96/108; 502/34; 502/56; 502/83; 502/84; 585/820
(58) Field of Search ................................. 95/95, 96, 114, 95/143, 144, 900; 502/34, 56, 62, 83, 84; 585/820, 826, 829, 830; 96/108

(56) References Cited

U.S. PATENT DOCUMENTS

| 2,965,687 | * | 12/1960 | Roberts et al. | 95/900 X |
| 3,232,028 | * | 2/1966 | McDonald et al. | 95/900 X |
| 4,933,159 | * | 6/1990 | Nowack et al. | 95/900 X |
| 5,258,571 | * | 11/1993 | Golden et al. | 95/900 X |

FOREIGN PATENT DOCUMENTS

| 0119789 | * | 9/1984 | (EP) | 95/144 |
| 62-111936 | * | 5/1987 | (JP) | 95/144 |

* cited by examiner

*Primary Examiner*—Robert H. Spitzer
(74) *Attorney, Agent, or Firm*—Ladas & Parry

(57) ABSTRACT

A group of solid adsorbents in the form of powder, granules or pellets having improved adsorptive capacity and selectivity for ethylene and/or propylene is disclosed. These adsorbents comprise (a) a silver compound and (b) a bentonite clay support bulk of which comprises $SiO_2$ and $Al_2O_3$ and the rest being oxides of Fe, Ca, Mg, Na and K and having sufficiently high surface area on which the silver compound is dispersed or impregnated. The support may be pretreated by polymer solutions to impart sufficient mechanical strength as measured by attrition loss. Mechanical strength may also be improved by pre-heating the support. These adsorbents are highly stable and are capable of reversibly adsorbing substantial quantity of ethylene and/or propylene at room temperature. The rates of adsorption of ethylene and/or propylene are also very high in these adsorbents, which is believed to be due to the synergistic interaction between the components of the novel composition of the present invention.

39 Claims, No Drawings

ADSORBENTS, METHOD FOR THE PREPARATION AND METHOD FOR THE SEPARATION OF UNSATURATED HYDROCARBONS FOR GAS MIXTURES

BACKGROUND OF THE INVENTION

1. Technical field of the Invention

This invention relates to an improved adsorbent useful in selective adsorption of unsaturated hydrocarbons and the manufacture of the adsorbent. More particularly, the invention relates to an adsorbent having a high degree of selectivity and affinity for olefin molecules and also having high adsorption capacity for olefins, and a process for producing the same. More specifically, this invention relates to a process for separating ethylene and /or propylene employing the novel, specially prepared adsorbent, from a mixed gas containing ethylene and/or propylene together with a component selected from the group consisting of $H_2$, $N_2$, Ar, He, $CH_4$, $C_2H_6$, $C_3H_8$, $CO_2$, CO and mixtures thereof.

2. Prior art

Unsaturated hydrocarbons such as ethylene and propylene are basic raw materials in synthetic chemistry. Demand for these gases is ever increasing. These are produced by naphtha/natural gas cracking or by dehydrogenation of paraffin. Invariably these are obtained as mixtures necessitating separation before their use. Prior art processes conventionally employed for the separation of ethylene from ethane and propylene from propane involved low temperature and/or high-pressure distillation. These processes are highly energy intensive and difficult to achieve and therefore, are not commercially very attractive. A common conventional process for the separation of mixture of ethane-ethylene is carried out at −25° C. and 320 psig in a distillation column containing over 160 trays and propane-propylene at −30° C. and 30 psig pressure in a distillation column containing over 200 trays [Keller, G. E; Marcinkowsky, A. E; Verma, S. K; Williamson, K. D.; Olefin Recovery and Purification via silver complexation; Li, N. N.; Calo, J. M.; *In Separation and Purification Technology*, Eds, Marcel Dekker, New York, 1992)]. It is now generally accepted that separations of ethane-ethylene and propane-propylene by distillation are some of the largest energy consuming separation processes in the petrochemical industry. Therefore, there is a large demand of an efficient and low cost, low energy process for the separation of olefins, particularly, ethane and propane from gas mixtures containing them, especially in view of the fact that demand for ethylene and propylene is ever increasing. For instance, world wide ethylene capacity of 80.8 million metric tons (mmt) is expected to grow to 122.1 mmt by 2005.

For the past several years, various attempts have been made to develop alternative technologies such as adsorption, chemical absorption and membrane separation processes. Of the various alternate technologies, adsorption appears to be the most promising [Eldridge, R. B., Olefin/Paraffin Separation Technology: A Review., *Ind. Eng.Chem. Res.*, 32, 2208, 1993]. Conventional adsorbents such as activated alumina, activated carbon, silica gel and zeolites do not show good selectivity for olefins over paraffins. Hence, development of a suitable adsorbent has become a key factor for the successful development of adsorption process.

Some of the adsorbents that have been reported for paraffin-olefin separation are CuCl [Gilliland, E. R., Bliss, H/ L., Kip, C. E., Reaction of olefins with solid cuprous halide, *J Am. Chem. Soc.*, 63, 2088, 1941; Gilliland, E. R., Concentration of Olefins, U.S. Pat. No. 2,369, 559, 1945, Long, R. B. Separation of Unsaturates by Complexing with solid copper salts., *In Recent Development in Separation Science*; Li, N.M. Ed., CRC Press, Cleveland, 1972) ion exchanged zeolites [Rosback, D. H., Olefin Separation Process Using Copper-Exchanged Type X Zeolites., U.S. Pat. No. 3, 755, 153, 1973; Rosback, D. H., Adsorbing Olefins with a Copper-Exchanged Type X Zeolite., U.S. Pat. No. 3, 720, 604, 1973); polymer supported aluminium silver chloride [Hirai, H., Kurima, K., Wada, K., Komiyama, M., Selective Ethylene Adsorbents Composed of Copper (I) Chloride and Polystyrene Resins having Amino Groups., *Chem Lett.*, 1513, 1985; Hira, H., Hara, S., Komiyama, M., Polystyrenc-Supported Aluminium Silver Chloride as selective Ethylene Adsorbent., *Angew. Makromol. Chem.*, 130, 207, 1985; Hirai, H., Polymer Complex for the Separation of Carbon Monoxide and Ethylene., *In Polymers For Gas Separation*; Toshima, N. Ed., VCH Publishers, Inc., New York, Chapter 7, 1992); and copper containing resins (Dielacher, M.; Hansen, U. Separation of Unsaturated Compounds from Liquid Hydrocarbon Mixtures Containing the Same, U.S. Pat. No. 3,979,280, 1976). Most of these prior art adsorbents, particularly, ion exchanged zeolites, polymer supported silver chloride and copper containing resins suffer from one or the other drawbacks such as slow adsorption kinetics, poor adsorption capacity, and/or selectivity. More recently, Yang and Kikkinides (New Sorbents for Olefins/Paraffin Separations by Adsorption via O-complcxation. *AIChE J* 41, 509, 1995) and Cho and coworkers [Wu, Z., Han, S.S., Cho, S.H., Kim, J. N., Chue, K. T., Yang, R.T., Modification of Resin-Type Adsorbents for Ethane/Ethylene Separation, *Ind Eng. Chem. Res.*, 36, 2749, 1997] have reported more promising adsorbents. Among the adsorbents reported by them, $Ag^+$ resin and $CuCl/Al_2O_3$ showed high olefin adsorption capacity and good selectivity. However, ethylene and propylene sorption kinetics on $Ag^+$ resin are slow. Xie et al (*Ind. Eng. Chem. Res.*, 36, 27749, 1997) have reported more promising adsorbants. $CuCl/Al_2O_3$ is CuCl dispersed on $\gamma$-$Al_2O_3$ by monolayer dispersion technique and hence, is obtained in powder form. For commercial use this adsorbent needs to be formed into pellets, which leads to reduction in adsorption capacity and selectivity. Further, adsorbent formulations prepared using Cu[I] compounds arc unstable and easily get oxidised to Cu(II) leading to a loss in adsorption capacity and selectivity of the adsorbent. Prior art also reports a series of adsorbents containing Cu(I). (Xie, Y. C., Tang Y. Q., Spontaneous Monolayer Dispersion of Oxides and Salts onto Surfaces Supports: Applications to Heterogenous Catalysis,*Advances in Ccitalysis*, 1, 37, 1990; Xie, Y. C., Bu, N.Y., Liu, J. Yang, G., Qiu, J. G., Yang, N. F., Tang,. Y. C., Adsorbents for Use in the Separation of Carbon Monoxide and/or Unsaturated Hydrocarbons from Mixed Gases. U.S. Pat. No. 4,917, 711, 1990) These were also prepared in powder form. Hence, these adsorbents also suffer from the above-mentioned drawbacks. Recently, a selective adsorbent with $AgNO_3$ dispersed on activated alumina with superior adsorption capacity, selectivity and rates of adsorption has been invented (Korean Patent Application No. 24912 filed on Jun. 26, 1998 and U.S. Patent Application No. 09/209,431 dated Dec. 11, 1998 by the present applicants). This adsorbent while, producing excellent and most unexpected results as compared to the adsorbents taught by the prior art exhibited an ethylene to ethane adsorbtion ratio of approximately 6 to 7. Considering the tremendous commercial need for olefins particularly, ethylene and propylene, the inventors of the present application were constantly in a search for an adsorbent which could provide even higher ethylene to ethane and propylene to propane adsorbtion ratio than the adsorbent of the co-pending Korean and U.S. applications referred to above and which also has a much higher rate of adsorbtion as compared to the known adsorbents.

OBJECTS OF THE INVENTION

It is therefore, the primary object of the present invention to provide an adsorbent having a high degree of selectivity and a high capacity for adsorbing unsaturated hydrocarbons, particularly, olefins.

It is a further object of the present invention to provide an adsorbent, which has a high selectivity and a high capacity for adsorbing olefins like ethylene and propylene.

It is a further object of the present invention to provide an adsorbent, which avoids the drawbacks of prior art, which is stable and does not lose its adsorbing capacity when pelletised.

It is another object of the present invention to provide an adsorbent having improved mechanical strength.

It is yet an important object of the present invention to provide a low cost, low energy process for the separation olefins, particularly, ethylene and propylene from gas mixtures.

It is yet another object of the present invention to provide a low cost low energy process for the separation olefins, particularly, ethylene and propylene from gas mixtures which operate at conditions of moderate temperature (0–100° C.) and pressures (0.2 to 100 atmospheres).

Finally, it is an important object of the present invention to provide an effective and commercially viable process for the preparation of an adsorbent for use in the above-mentioned separation process.

SUMMARY OF THE INVENTION

It has now been found that a group of solid adsorbents in the form of powder, granules or pellets have improved adsorptive capacity and selectivity for ethylene and/or propylene not known in the prior art and that they can be produced by the process described below. These adsorbents comprise (a) a silver compound and (b) a bentonite clay support bulk of which comprises $SiO_2$ and $Al_2O_3$ and the rest being oxides of Fe, Ca, Mg, Na and K and having sufficiently high surface area on which said silver compound is dispersed or impregnated. The support may be pretreated by polymer solutions to impart sufficient mechanical strength as measured by attrition loss. Mechanical strength may also be improved by pre-heating the support. These adsorbents are highly stable and are capable of reversibly adsorbing substantial quantity of ethylene and/or propylene at room temperature. The rates of adsorption of ethylene and/or propylene are also very high in these adsorbents, which is believed to be due to the synergistic interaction between the components of the novel composition of the present invention.

Thus, according to the present invention there is provided a novel adsorbent composition for selective adsorption of unsaturated hydrocarbons from its mixture with saturated hydrocarbons, carbon dioxide, permanent gases or mixtures thereof, which comprises:

(a) a silver compound and (b) an activated bentonite clay support bulk of which is made of SiO2 and Al1203 and the balance being oxides of Fe, Ca, Mg, Na, and K.

In a preferred embodiment, the adsorbent of the present invention comprises: a silver and an activated bentonite clay support bulk of which is made of SiO2 and Al1203 and the balance being oxides of Fe, Ca, Mg, Na, and K, said adsorbent having the following composition:

| silver compound | 1 to 70 |
|---|---|
| $SiO_2$ | 15–80 |
| $Al_2O_3$ | 1–14 |
| $Fe_2O_3$ | 0–12 |
| CaO | 0–5 |
| $Mg_O$ | 0–5 |
| $Na_2O$ | 0–5 |
| $K_2O$ | 0–5 |

The unsaturated hydrocarbons are preferably, ethylene or propylene.

The present invention also provides a process for the preparation of a novel adsorbent composition for selective adsorption of unsaturated hydrocarbons from its mixture with saturated hydrocarbons, carbon dioxide, permanent gases or mixtures thereof, which comprises dispersing or impregnating in any conventional manner a silver compound of the kind such as herein described in a solid form or in solution, with a support material comprising of activated bentonite clay, and subjecting the resultant composite material to heat treatment to produce said adsorbent.

In a preferred embodiment, said activated bentonite clay has the following composition

| $SiO_2$ | 50–85 |
|---|---|
| $Al_2O_3$ | 4–14 |
| $Fe_2O_3$ | 2–12 |
| CaO | 0–5 |
| MgO | 0–5 |
| $Na_2O$ | 0–5 |
| $K_2O$ | 0–5 | all proportions being expressed in terms of weight %, so that the resultant adsorbent has the following composition:

| Silver compound | 1–70 |
|---|---|
| $SiO_2$ | 15–80 |
| $Al_2O_3$ | 1–14 |
| $Fe_2O_3$ | 0–12 |
| CaO | 0–5 |
| MgO | 0–5 |
| $Na_2O$ | 0–5 |
| $K_2O$ | 0–5 | all proportions being expressed in terms of weight % of the composition.

In an alternative embodiment, the present invention provides a process for the preparation of an adsorbent having improved mechanical strength for the selective adsorption of unsaturated hydrocarbons from its mixture with one of saturated hydrocarbons, carbon dioxide, permanent gases or mixtures thereof, said process comprising dispersing or impregnating in any conventional manner a silver compound in a solid form or in solution, with a support material comprising of activated bentonite clay, bulk of which is made of $SiO_2$ and $Al_2O_3$ and the balance being oxides of Fe, Ca, Mg, Na, and K and subjecting the resultant composite material to heat treatment to produce said adsorbent, wherein said support is impregnated with a solution of a polymer prior to or after said impregnation with said silver compound.

In another alternative embodiment, the present invention relates to a process for the preparation of an adsorbent having improved mechanical strength for the selective adsorption of unsaturated hydrocarbons from its mixture with one of saturated hydrocarbons, carbon dioxide, permanent gases or mixtures thereof, said process comprising providing a support material comprising of activated bentonite clay, bulk of which is made of $SiO_2$ and $Al_2O_3$ and the balance being oxides of Fe, Ca, Mg, Na, and K, heating said support material to a temperature in a range of 150 to 500° C. for a period of 0.5 to 24 hrs, dispersing or impregnating in any conventional manner a silver compound of the kind such as hereinbefore described in a solid form or in solution, on said preheated support and subjecting the resultant composite material to further heat treatment to produce said adsorbent having improved mechanical properties.

The present invention also provides a process for the separation of unsaturated hydrocarbons from mixed gases containing such hydrocarbons by selective adsorption which comprises passing a stream of said mixed gases through a mass of an adsorbent at a temperature from 0–100° C. and pressure from 0.2 to 100 atmospheres and releasing the adsorbed ethylene and/or propylene by lowering pressure and/or increasing temperature, wherein said adsorbent comprises:

(a) a silver compound and (b) an activated bentonite clay support bulk of which is made of SiO2 and Al1203 and the balance being oxides of Fe, Ca, Mg, Na, and K.

DETAILED DESCRIPTION OF THE INVENTION

The adsorbents of this invention are obtained by dispersion of silver compound on the surface of an acid activated bentonite clay support. Many silver (I) compounds or silver (II) compounds or their mixtures can be used as the silver compound. When silver (II) compounds are used as silver compound, silver (II) needs to be reduced to silver (I) in a reducing atmosphere. Silver compound which may be suitably utilised in the practice of this invention include, for example, silver nitrate, silver halides such as silver chloride, silver bromide and silver iodide, silver perchlorate, silver tetrafluoroborate, silver carboxylates such as silver formate and silver acetate, and silver oxide. Preferred silver compounds are silver nitrate, silver acetate and silver tetrafluoroborate.

Solid supports required for the preparation of the selective adsorbents of the present invention are obtained by acid activation of bentonite clay. Acid activation of clay using mineral acids is well known in the prior art (Prakash Kumar et al., Ind. Eng. Chem. Res. 34, 1440, 1990).

Acid activation of the bentonite clay results in the support with a range of composition and surface area. The composition of the acid treated bentonite clay useful as a support in the present invention is given in Table 1 below:

TABLE 1

Composition of acid activated clays.

| Compound | Composition, wt % |
|---|---|
| $SiO_2$ | 50–85 |
| $Al_2O_3$ | 4–14 |
| $Fe_2O_3$ | 2–12 |
| CaO | 0–5 |
| MgO | 0–5 |
| $Na_2O$ | 0–5 |
| $K_2O$ | 0–5 |

The above acid activated bentonite clays have surface area in the range of 100–400 m2/g. The activated bentonite clays are known to catalyse unsaturated hydrocarbons at a higher temperature due to their acidic nature. However, the acidity of the activated bentonite clays can be modified by alkali treatment to reduce the catalytic activity of the clay support. The suitable acidity as measured by pH of the dispersed clays is in the range of 2–7, preferably greater than 4.

In order to obtain adsorbent with improved mechanical strength, the support is impregnated with a polymer to the extent of 1 to 10% by wt., prior to impregnation of the silver compound. Examples of polymers that may be conveniently employed in the present invention are polycarbonate, methyl cellulose and ethyl cellulose. The polymer is first dissolved in a suitable solvent and the solid support is added to the polymer solution and equilibrated for 10 minutes to 2 hours. Thereafter, the solvent is removed by filtration followed by purging and heating or by evacuation. The resultant support is heated at 100 to 250° C. for a period of 1 to 10 hrs. The recovered solvent may be re-used. The solvent is ideally selected from the group consisting of chloroform, methyl ethyl ketone, methyl alcohol, ethyl alcohol and acetone. Polymer impregnation may also be carried out after impregnation with silver compound.

Mechanical strength of the support may also be improved by preheating the support at 150 to 500° C. for 0.5 to 24 hours, prior to impregnation with silver compound.

In the process for the preparation of the adsorbent according to the present invention, a mixture containing the silver compound and an acid treated bentonite clay support is used. The above mixture can be obtained by adding to the support a solution or suspension of the silver compound in a suitable solvent, equilibrating for a period of 0.1 to 24 hours, preferably 1 to 4 hours, and thereafter, removing the solvent from the resultant mixture by heating and/or purging with air/inert gas or by pumping. Suitable solvents include water, hydrochloric acid containing aqueous solution, primary or secondary alcohols having 1 to 7 carbon atoms, acetone, ethyl acetate, hydrocarbons having 4 to 7 carbon atoms, proprionitrile, and acetonitrile.

The mixture may also be obtained by physically mixing silver compound in solid support in powder form without using any solvent. In the above described mixture containing the silver compound and the support, the amount of silver in the form of the compound is preferably 1 to 70% by weight of adsorbent composition.

Thereafter, the prepared mixture containing the silver compound and the support is subjected to heating. The heating step can be performed at a temperature in the range of 30 to 350° C., preferably at 100 to 250° C. for a period of time from about 0.1 to about 48 hours, preferably from about 1 to 10 hours. The heating step can be conducted in a suitable atmosphere such as nitrogen or helium.

Typically, the adsorbent of the present invention has the following composition with all the amounts expressed in percentages by weight:

| Component | Amount |
|---|---|
| Silver compound | 1 to 70 |
| $SiO_2$ | 15–80 |
| $Al_2O_3$ | 1–14 |
| $Fe_2O_3$ | 0–12 |
| CaO | 0–5 |
| MgO | 0–5 |
| $Na_2O$ | 0–5 |
| $K_2O$ | 0–5 |

The adsorbents of the invention described above can be used to separate unsaturated hydrocarbons, particularly, olefins, more particularly, ethylene or propylene from mixed gas. The separation process comprises passing a stream of the mixed gas through an adsorber bed charged with the adsorbent(s) of the invention. The adsorbed, unsaturated hydrocarbon, for instance, ethylene and/or propylene can be readily desorbed either by lowering the pressure or by increasing the temperature of the adsorber bed, which also regenerates the adsorbent. The adsorbent so regenerated can be reused as an adsorbent for the separation of ethylene and/or propylene from the mixed gas. Raw material gases wherein ethylene and/or propylene are present as impurities can be purified by this separation process.

The invention will now be illustrated by the following illustrative but non limitative examples. While, the examples relate to adsorption of ethylene and/or propylene, it will be readily apparent to a person skilled in the art that the adsorbent of the present invention will be equally effective in separation of any unsaturated hydrocarbon.

The adsorption capacity, selectivity and adsorption uptake data involved in these examples were measured in CAHN 1100 microbalance system. In a typical adsorption measurement, a known quantity of the adsorbent was loaded in the CAHN 1100 microbalance system and activated under the flow of ultra high purity helium gas at 200° C. for several hours. The adsorbent was then cooled to room temperature under helium flow. The microbalance was then evacuated to $10^{-4}$ mm Hg using a two-stage turbo molecular pump. Pure hydrocarbon gas was then admitted into the microbalance and the amount of gas adsorbed by the amount is noted at 1 atm pressure. The amount of gas adsorbed at different time intervals was also recorded. Adsorption selectivity reported in the examples is the ratio of pure component adsorption capacity of olefin over corresponding paraffin at 1 atm and 25° C.

The acidity of the clay supports used in the present invention were ascertained by measuring the pH of the 10% clay dispersed in water.

The mechanical strength of the adsorbent is ascertained by measuring attrition loss of the adsorbent by rotating tube method. The attrition test was conducted in an instrument (supplied by Geomecanique, France) fitted with four cylindrical stainless steel tubes of 36 mm inner diameter and 305 inside length. In a typical experiment, about 25 g of the adsorbent is loaded in each of the four cylindrical tubes and rotated around an axle with a speed of 25 rpm for 90 minutes. The sample was then sieved using a sieve with an aperture equal to ⅔ of the lower characteristic size of the adsorbent particles.

The attrition loss, A% is given by the relation:

$$A\% = \frac{\text{Wt. of the adsorbent before the test} - \text{Wt. remaining in the sieve}}{\text{Wt. of the adsorbent before the test}} \times 100$$

EXAMPLE 1

100 g of Indian bentonite clay powder was acid activated with 0.6 N sulphuric acid and the excess acid was removed by washing with distilled water. The acid activated clay thus obtained was dried in an air oven at 110° C. for 8 hours. BET surface of this clay was 390m²/g. Silver nitrate solution prepared by dissolving 2.0 g of silver nitrate in 3.5 ml demineralised water was thoroughly mixed with 5.24 g of activated clay obtained above (10/20 mesh size) and allowed to equilibrate for 2 hours at room temperature. The wet adsorbent was dried at room temperature by purging with nitrogen gas. The resultant adsorbent was dried at 110° C. for 6 hours followed by calcination at 200° C. for 6 hours under helium flow. The chemical composition of the resultant adsorbent is given in Table 2. Adsorption of ethane, ethylene, propane, propylene and carbon monoxide have been measured at 25° C. and 760 mm Hg pressure on the resultant adsorbent. The adsorbed ethylene or propylene was completely desorbed by evacuation at 100° C. The adsorbent was able to readsorb the same amount of ethylene or propylene under the same conditions.

The adsorbent adsorbed 1.55 mmol/g and 0.14 mmol/g of ethylene and ethane respectively at 25° C. and 760 mmHg pressure. The adsorbed ethylene and ethane were completely desorbed by evacuation at 100C. The adsorption selectivity of the adsorbent at 25° C. and 760 mmHg for ethylene over ethane was 11.1. Under the same experimental conditions, the starting acid activated clay support adsorbed 0.43 and 0.34 mmol/g of ethylene and ethane respectively. The adsorption selectivity ratio of the clay support for ethylene over ethane was 1.3. The same adsorbent after regeneration adsorbed 1.76mmol/g and 0.39 mmol/g of propylene and propane respectively at 25° C. and 760 mmHg pressure. The adsorption selectivity ratio of the adsorbent for propylene to propane was 4.5 respectively. The adsorbent adsorbed 0.13 mmol/g of carbon monoxide and 0.26 mmol/g carbon dioxide at 100 mmHg partial pressure and 25° C. The rates of adsorption of ethylene was also fast on this adsorbent as evident from the fact that 85% of ethylene capacity had reached with in one minute.

EXAMPLE 2

10 g of the acid activated clay obtained as described in Example 1 was mixed thoroughly with 4.5 g of silver nitrate in a pestle and mortar. This mixture was then calcined at 220° C. for 10 hours under nitrogen flow. The powder adsorbent thus obtained adsorbed 1.25 mmol/g of ethylene at 25° C. and 1 atmosphere. The chemical composition of the adsorbent is given in Table 2.

EXAMPLE 3

Commercially available acid activated clay support (7.5 g) in granular shape (10/60 mesh) with 360 m²/g surface area was impregnated with silver nitrate solution prepared by dissolving 3.15 g of silver nitrate in 5.5 ml demineralised water as described in Example 1. The resultant adsorbent was dried at 110° C. for 6 hours followed by calcination at 175° C. for 16 hours under nitrogen flow. The chemical composition of the resultant adsorbent is given in Table 2. The adsorbent adsorbed 1.39 and 0.22 mmol/g of ethylene and ethane respectively at 25° C. and 1 atm pressure. About 82% of ethylene was adsorbed with in the first one minute. Under the similar experimental conditions the above adsorbent after regeneration adsorbed 1.86 and 0.53 mmol/g of propylene and propane respectively. The adsorption selectivity ratio of the adsorbent for ethylene to ethane and propylene to propane was 6.4 and 3.5 respectively at 25° C. and 1 atm. At 25° C., the adsorbent adsorbed 0.10 and 0.28 mmol/g carbon monoxide at 54 and 760 mmHg respectively.

EXAMPLE 4

Commercial acid activated clay support with 360 m²/g surface area was first treated with 0.3 N sodium hydroxide solution for 2–3 minutes. The clay support was then washed and dried at 120° C. for 6 hours. The pH of 10% clay dispersed in water was 7.95 compared to 2.90 for the untreated clay indicating substantial decrease in acidity for the modified support. Silver nitrate impregnation was carried out on 500 g of thus prepared clay as described in Example 1. This adsorbent adsorbed 1.36 and 1.66 mmol of ethylene and propylene at 25° C. and 760 mm Hg per g of adsorbent. The adsorbed ethylene or propylene was completely desorbed by evacuation at 100° C. The adsorption selectivity ratio of the adsorbent for ethylene to ethane and propylene to propane were 7.2 and 3.8 respectively. The adsorbent adsorbed 0.19 mmol/g CO and 0.21 mmol/g of $CO_2$ at 25° C. and 1 atmosphere.

EXAMPLE 5

Silver acetate solution prepared by dissolving 2.0 g of silver nitrate in 5.0 ml demineralized water was mixed with 5.04 g of acid activated clay prepared as described in Example 1 with higher concentration of sulfuric acid. The mixture was allowed to equilibrate for 1 hour at room temperature. The excess solvent was dried at room temperature by purging with helium gas. The resultant adsorbent was further dried at 110° C. for 4 hours followed by calcination at 200° C. for 6 hours under helium flow. The adsorbent adsorbed 1.28 mmol of ethylene at 25° C. and 760 mm Hg pressure of ethylene. The adsorbed ethylene was completely desorbed by evacuation at 100° C. The adsorbent was able to adsorb the same amount of ethylene under the same conditions.

EXAMPLE 6

10 g of acid activated clay support (10/20 mesh size) prepared as described in Example 1 was impregnated with polycarbonate resin, Lexan R-141 grade supplied by GE Plastics, India. Polycarbonate resin (0.2 g) was dissolved in 5 ml of chloroform solvent. This polymer solution was mixed with 10 g of the above acid activated clay support. After a thorough mixing for 15 minutes, the solvent was recovered under vacuum using a rota-evaporator. The resultant polymer containing support was activated by heating first at 110° C. for 6 hours followed by heating at 150° C. under $N_2$ flow for 4 hours. The polymer treated support thus obtained was further impregnated with silver nitrate solution prepared by dissolving 4.02 g of silver nitrate in 3.5 ml demineralised water as described in Example 1. The resultant adsorbent was dried at 110° C. for 3 hours followed by calcination at 200° C. for 4 hours under nitrogen flow. The chemical composition of the resultant adsorbent is given in Table 2. The adsorbent adsorbed 1.44 and 0.14 mmol/g of ethylene at 25° C. and 1 atm pressure. The adsorbent adsorbed 75% of its ethylene capacity with in first one minute. The adsorption selectivity ratio of the adsorbent for ethylene over ethane was 10.2. The adsorbed ethylene could be completely desorbed by evacuation at 100° C. The adsorbent thus regenerated adsorbed the same quantity of ethylene as in the first time under similar experimental conditions, showing complete reversibility of adsorption process.

EXAMPLE 7

10 g of acid activated clay support as prepared by the method of Example 1 was impregnated with 0.6 g of polycarbonate resin, Lexan R-141 by the method described in Example 6. The polymer treated support thus obtained was impregnated with silver nitrate solution prepared by dissolving 4.02 g of silver nitrate in 3.5 ml demineralised water as described in Example 1. The resultant adsorbent was dried at 110° C. for 3 hours followed by calcination at 200° C. for 4 hours under nitrogen flow. The adsorbent adsorbed 1.24 mmol/g of ethylene at 25° C. and 1 atm. pressure. The adsorption selectivity ratio of the adsorbent for ethylene over ethane was 9.2. The adsorbed ethylene could be completely desorbed by evacuation at 100° C. The adsorbent showed 0.21 wt. % attrition loss on rotation compared to 0.64 wt % for adsorbent of Example 1 without polymer treatment.

EXAMPLE 8

0.4 g of ethylcellulose supplied by S. D. Fine Chemicals, Mumbai dissolved in 6 ml of methyl ethyl ketone was mixed with 10 g of acid activated clay prepared as described in Example 1 and equilibrated for 10 minutes with thorough mixing. Solvent was then removed by purging with air at ambient temperature followed by heating at 110° C. with nitrogen purge for 5 hours. The support was further dried at 150° C. for 2 hours. The polymer containing support was then impregnated with silver nitrate solution prepared by dissolving 4.01 g of silver nitrate in 3.7 ml of demineralised water as described in Example 1. The resultant adsorbent was dried at 110° C. for 4 hours followed by calcination at 175° C. for 6 hours under nitrogen flow. The adsorbent adsorbed 1.29 mmol/g of ethylene at 25° C. and 1 atm pressure. The adsorption selectivity ratio of the adsorbent for ethylene over ethane was 8.1. The adsorbed ethylene could be completely desorbed at 100° C. The adsorbent showed 0.21 wt % attrition loss on rotation as compared to 0.64 wt % for adsorbent of Example 1 without polymer treatment.

EXAMPLE 9

10 g of acid activated clay support prepared as described in Example 1 was calcined at 350° C. in a muffle furnace for 4 hours. The support was cooled to ambient temperature. The support thus obtained was impregnated with silver nitrate solution prepared by dissolving 3.902 g of silver nitrate in 4.5 ml demineralised water as described in Example 1. The resultant adsorbent was dried at 110° C. for 4 hours followed by calcination at 185° C. for 2 hours. The adsorbent adsorbed 1.28 and 0.11 mmol/g of ethylene and ethane respectively at 25° C. and 1 atm pressure. About 88% of ethylene adsorption capacity took place with in a minute. The adsorption selectivity ratio of the adsorbent for ethylene over ethane was 11.6 at 25° C. and 1 atm. The adsorbed ethylene could be completely desorbed at 75° C. under vacuum. The adsorbent showed 0.08 wt % attrition loss on rotation as compared to 0.64 wt % for adsorbent of Example 1 with out pre-heat treatment of support clay

EXAMPLE 10

500 g of the adsorbent was prepared in the same manner as described in Example 4. 120 g of this adsorbent was packed in a stainless steel column of 200 mm height and 27 mm diameter. The adsorbent was activated at 200° C. for 3 hours under nitrogen flow and then cooled to ambient temperature (16–18° C.). Four step semi-continuous adsorption-desorption cycles were carried out in the above column using the feed mixture consisting of 68.91% of ethylene, 31.09% of ethane by volume and traces of acetylene, carbon dioxide, methane and hydrogen. The semi-continuous cycle steps consisted of ethane pressurisation, adsorption with feed, ethylene rinse, and vacuum desorption. Step time, flow rate and bed pressure during each step are given below:

| Step | Time/sec | Flow rate/sccm | Pressure/mmHg |
|---|---|---|---|
| Ethane pressurisation | 110 | — | 820 |
| Adsorption | 150 | 480 | 1320 |
| Ethylene rinse | 80 | 250 | 1200 |
| Vacuum desorption | 150 | — | 45–50 |

The data by this cyclic adsorption-desorption cycles was reproducible, which ensured the existence of steady state conditions. The purity of effluent ethane gas was better than 98%. Ethylene product with >99% purity and >95% recovery could be obtained.

TABLE 2

Chemical composition of various adsorbent formulations described in the Examples

| | Composition/wt % | | | | |
|---|---|---|---|---|---|
| Component | Example 1 | Example 2 | Example 3 | Example 4 | Example 5 |
| $AgNO_3$ | 27.6 | 31.0 | 29.6 | 26.7 | 28.4* |
| $SiO_2$ | 49.8 | 47.5 | 50.9 | 52.9 | 57.3 |
| $Al_2O_3$ | 11.7 | 11.1 | 12.3 | 12.8 | 8.4 |
| $Fe_2O_3$ | 6.2 | 5.9 | 2.3 | 2.3 | 3.7 |
| CaO | 0.6 | 0.5 | 0.6 | 0.6 | 0.3 |
| MgO | 2.0 | 1.9 | 2.7 | 2.9 | 1.0 |
| $Na_2O$ | 1.6 | 1.5 | 0.9 | 1.1 | 0.6 |
| $K_2O$ | 0.5 | 0.5 | 0.7 | 0.7 | 0.3 |

*is silver acetate composition in the adsorbent.

What is claimed is:

1. A process for the separation of olefin molecules or mixtures thereof from a mixed gas containing said olefin molecules or a mixture thereof, which comprises:

passing said mixed gas through an adsorbent comprising a (i) a silver compound and (ii) an activated bentonite clay support the bulk of which is made of $SiO_2$ and $Al_2O_3$ and the balance being oxides of Fe, Ca, Mg, Na and K, at a temperature in the range of from 0 to 100° C. and a pressure in the range of 1 to 100 atmospheres, to effect adsorption of said olefin, and releasing the adsorbed olefin.

2. A process as claimed in claim 1, wherein the mixed gas comprises a component selected from the group consisting of $H_2$, $N_2$, Ar, He, $CH_4$, $C_2H_2$, $C_2H_6$, $C_3H_8$, CO, $CO_2$ and mixtures thereof.

3. A process as claimed in claim 1, wherein said olefin is ethylene or propylene.

4. A process as claimed in claim 1 wherein the releasing is accompanied by lowering the pressure and/or heating the support.

5. An adsorbent composition for the selective adsorption of unsaturated hydrocarbons from a mixture thereof with one or more of saturated hydrocarbons, carbon dioxide, permanent gases or mixtures thereof, said adsorbent comprising: a silver compound and an activated bentonite clay support the bulk of which is made of $SiO_2$ and $Al_2O_3$ and the balance being oxides of Fe, Ca, Mg, Na, and K, being present in the following proportions by weight:

| silver compound | 1 to 70 |
|---|---|
| $SiO_2$ | 15–80 |
| $Al_2O_3$ | 1–14 |
| $Fe_2O_3$ | 0–12 |
| CaO | 0–5 |
| MgO | 0–5 |
| $Na_2O$ | 0–5 |
| $K_2O$ | 0–5 | all proportions being expressed in terms of weight % of the composition.

6. An adsorbent as claimed in claim 5 wherein the silver compound is selected from the group consisting of silver nitrate, silver halides, silver perchlorate, silver tetrafluoroborate, silver carboxylates, and silver oxide and any mixture thereof.

7. An adsorbent as claimed in claim 6 wherein said silver halides are selected from the group comprising of silver chloride, silver bromide and silver iodide.

8. An adsorbent as claimed in claim 6 wherein said silver carboxylates are selected from silver formate and silver acetate.

9. An adsorbent as claimed in claim 5 wherein said activated bentonite clay support is an acid activated bentonite clay support.

10. An adsorbent as claimed in claim 9 wherein said acid is a mineral acid.

11. An adsorbent as claimed in claim 5 wherein said activated bentonite clay support is pretreated by polymer solutions.

12. An adsorbent as claimed in claim 5 wherein said activated bentonite clay support is preheated to improve mechanical support.

13. An adsorbent as claimed claim 5 wherein said support has a surface area of 100–400 $m^2/g$.

14. A process for the preparation of an adsorbent for the selective adsorption of unsaturated hydrocarbons from their mixture with one of saturated hydrocarbons, carbon dioxide, permanent gases or mixtures thereof, said process comprising dispersing or impregnating a silver compound in a solid form or in a solution, with a support material comprising activated bentonite clay, and subjecting the resultant composite material to heat treatment to produce said adsorbent, wherein said activated bentonite clay has the following composition:

| $SiO_2$ | 50–85 |
|---|---|
| $Al_2O_3$ | 4–14 |
| $Fe_2O_3$ | 2–12 |
| CaO | 0–5 |
| MgO | 0–5 |
| $Na_2O$ | 0–5 |
| $K_2O$ | 0–5 | all proportions being expressed in terms of weight %, so that the resultant adsorbent has the following composition:

| Silver compound | 1–70 |
|---|---|
| $SiO_2$ | 15–80 |
| $Al_2O_3$ | 1–14 |

| | |
|---|---|
| Fe$_2$O$_3$ | 0–12 |
| CaO | 0–5 |
| MgO | 0–5 |
| Na$_2$O | 0–5 |
| K$_2$O | 0–5 | all proportions being expressed in terms of weight % of the composition.

15. A process as claimed in claim 14 wherein said silver compound is selected from the group consisting of silver nitrate, silver halides, silver perchlorate, silver tetrafluorobrate, silver carboxylates and silver oxide and any mixture thereof.

16. A process as claimed in claim 14 wherein the said support is activated by treatment with a mineral acid.

17. A process as claimed in claim 14 wherein said activated bentonite clay has a surface area of 100–400 m$^2$/g.

18. A process as claimed in claim 14 wherein said activated bentonite clay has a pH in the range of 2 to 7.

19. A process as claimed in claim 18, wherein the pH is in the range of 4 to 7.

20. A process as claimed in claim 14 wherein the silver compound is in the form of a solution.

21. A process as claimed in claim 20, wherein the solution comprises a solvent and the solvent is selected from the group consisting of water, alcohol, hydrocarbons, aqueous hydrochloric acid, acetone, ethyl acetate, propionitrile and acetonitrile.

22. A process as claimed in claim 21 wherein said alcohol is selected from primary or secondary alcohol having from 1 to 7 carbon atoms and said hydrocarbons are selected from hydrocarbons having from 4 to 7 carbon atoms.

23. A process as claimed in claim 14 wherein after contacting said solution of the silver compound with said support material, the reaction mixture is equilibrated for a period of 0.1 to 24 hours.

24. A process as claimed in claim 23 wherein after the reaction mixture is equilibrated excess solvent is removed by heating or purging with an inert gas.

25. A process as claimed in claim 23, wherein the reaction mixture is equilibrated for a period of 1 to 4 hours.

26. A process as claimed in claim 14 wherein the heat treatment is carried out at a temperature of 30 to 350° C.

27. A process as claimed in claim 26 wherein the heat treatment is carried for 0.1 to 48 hours.

28. A process as claimed in claim 27 wherein said heat treatment is carried out in an atmosphere of nitrogen or helium.

29. A process as claimed in claim 28, wherein said heat treatment is carried out for 1 to 10 hours.

30. A process as claimed in claim 26, wherein said heat treatment is carried out at a temperature of 100 to 250° C.

31. A process as claimed in claim 14 wherein said activated clay support is a polymer pretreated support or a heat pretreated support.

32. A process as claimed in claim 31 wherein said polymer is selected from the group consisting of polycarbonates, methyl cellulose and ethyl cellulose.

33. A process for the preparation of an adsorbent having improved mechanical strength for the selective adsorption of unsaturated hydrocarbons from a mixture thereof with one of saturated hydrocarbons, carbon dioxide, permanent gases or mixtures thereof, said process comprising dispersing or impregnating a silver compound in a solid form or in solution, with a support material comprising activated bentonite clay, the bulk of which is made of SiO$_2$ and Al$_2$O$_3$ and the balance being oxides of Fe, Ca, Mg, Na, and K and subjecting the resultant composite material to heat treatment to produce said adsorbent, wherein said support is treated with a solution of a polymer prior to or after impregnating said silver compound.

34. A process as claimed in claim 33 wherein said support is treated with a solution of a polymer obtained by dissolving said polymer in a solvent to form a polymeric solution, treating said support with said polymeric solution followed by equilibration, removing said solvent and heating said support at a temperature of 100 to 250° C.

35. A process as claimed in claim 34 wherein said solvent is selected from the group consisting of chloroform, methyl ethyl ketone, methyl alcohol, ethyl alcohol and acetone.

36. A process as claimed in claim 35 wherein said equilibration is carried out for a period of 10 minutes to 2 hrs.

37. A process as claimed in claim 34 wherein said support is heated for 1 to 10 hrs.

38. A process as claimed in claim 33 wherein said polymer is selected from the group consisting of polycarbonates, methyl cellulose and ethyl cellulose.

39. A process for the preparation of an adsorbent having improved mechanical strength for the selective adsorption of unsaturated hydrocarbons from its mixture with one of saturated hydrocarbons, carbon dioxide, permanent gases or mixtures thereof, said process comprising providing a support material comprising activated bentonite clay, the bulk of which is made of SiO$_2$ and Al$_2$O$_3$ and the balance being oxides of Fe, Ca, Mg, Na and K, heating said support material to a temperature in a range of 150 to 500° C. for a period of 0.5 to 21 hrs, dispersing or impregnating a silver compound in a solid form or in a solution, on said support which has been heated and subjecting the resultant composite material to heat treatment to produce adsorbent having improved mechanical properties.

* * * * *